UNITED STATES PATENT OFFICE.

WILLIAM H. BRABANT, OF SHEBOYGAN, WISCONSIN.

COMPOSITION FOR PREVENTING THE ACCUMULATION OF MOISTURE ON GLASS SURFACES.

1,404,829.   Specification of Letters Patent.   Patented Jan. 31, 1922.

No Drawing.   Application filed January 19, 1921. Serial No. 438,461.

*To all whom it may concern:*

Be it known that I, WILLIAM H. BRABANT, a citizen of the United States, residing at Sheboygan, in the county of Sheboygan and State of Wisconsin, have invented certain new and useful Improvements in Compositions for Preventing the Accumulation of Moisture on Glass Surfaces, of which the following is a specification.

This invention relates to a novel composition of matter for application to automobile wind shields, locomotive cab windows, street railway motorman's windows, store and house windows, and in fact windows or shields of glass wherever employed, for the purpose of preventing the accumulation of moisture in drops or globules and thereby maintaining the transparency of the pane of the wind shield, window, or the like.

Another object of the invention is to provide a composition which may be readily and conveniently applied to the pane of a wind shield, window or the like and which by its presence will insure against the accumulation of moisture in the form of drops, occasioned by the pane being exposed to rain, snow, sleet, frost, or moisture laden air or vapors liable to condensation.

Another object of the invention is to provide a composition for the purpose stated which will be non-poisonous and which will not corrode any metal parts with which it may come in contact, or have any damaging effect upon any painted or varnished surface, or leave any blurs upon the pane after the latter has again become dry.

The composition embodying the invention consists of a mixture of sugar and paraffin wax and in preparing the composition 1 melt a suitable quantity of wax and add to it a suitable quantity of white granulated sugar and stir the mixture until the sugar has been intimately mixed with the melted wax and thoroughly distributed throughout the mass thereof. While still warm, the mixture may be poured or pressed into suitable molds and permitted to cool after which the molded cakes are ejected from the molds and are ready for use. The composition may be molded in various forms as for example a cake, stick, tablet, of the like, and each article so produced will comprise a body of paraffin wax having sugar particles in a state of suspension therein.

I may employ the ingredients in various proportions but have found that best results may be obtained by mixing one part of paraffin wax with four parts of sugar. Also while I preferably employ white granulated sugar, it will be understood that I may make use of pulverized sugar, brown sugar, or any other saccharine substance chemically similar to ordinary sugar.

In the use of the composition, the cake or other molded form thereof is rubbed over the wet or moist surface of a pane of glass to be treated, or a moistened cloth may be rubbed on the cake and the cloth then rubbed on the pane of glass, in the event the pane is not already moist. The presence of an extremely thin film of the composition upon a pane of glass will entirely prevent the accumulation of moisture in the form of drops or globules due probably to the fact that the sugar, going into solution, will destroy or greatly lessen the surface tension of the water causing the same to spread in the form of a thin film rather than to accumulate in the form of drops or globules.

Having thus described the invention, what is claimed as new is:

1. A composition for the purpose stated comprising sugar and a binder of wax.

2. A composition for the purpose stated comprising a body of wax having particles of sugar in a state of suspension therein.

In testimony whereof I affix my signature.

WILLIAM H. BRABANT. [L. S.]